United States Patent
Shin

(10) Patent No.: US 9,417,730 B2
(45) Date of Patent: Aug. 16, 2016

(54) ELECTRONIC DEVICE WITH TOUCH SENSOR AND DRIVING METHOD THEREOF

(71) Applicant: LG DISPLAY CO., LTD., Seoul (KR)

(72) Inventor: Sunkyung Shin, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 68 days.

(21) Appl. No.: 14/473,116

(22) Filed: Aug. 29, 2014

(65) Prior Publication Data

US 2015/0062042 A1    Mar. 5, 2015

(30) Foreign Application Priority Data

Sep. 3, 2013    (KR) .......................... 10-2013-0105452

(51) Int. Cl.
*G06F 3/041*    (2006.01)

(52) U.S. Cl.
CPC .................................... *G06F 3/0418* (2013.01)

(58) Field of Classification Search
CPC ....... G06F 3/044; G06F 3/0418; G06F 3/0416; G06F 2203/04104; G06F 3/041; G06F 3/0412
USPC .......... 345/173, 174; 178/18.01, 18.03, 18.06
See application file for complete search history.

(56) References Cited

U.S. PATENT DOCUMENTS

| | | | |
|---|---|---|---|
| 8,031,094 B2* | 10/2011 | Hotelling | 341/139 |
| 2007/0262969 A1* | 11/2007 | Pak | G06F 3/0418 345/173 |
| 2014/0074436 A1* | 3/2014 | Voris | G01R 27/2605 702/194 |
| 2014/0218331 A1* | 8/2014 | Chang | G06F 3/044 345/174 |

* cited by examiner

*Primary Examiner* — Koosha Sharifi-Tafreshi
(74) *Attorney, Agent, or Firm* — Brinks Gilson & Lione

(57) ABSTRACT

An electronic device with a touch sensor comprises: a touch screen including touch sensors defined by Tx lines and Rx lines; a touch sensing circuit that supplies a drive signal to the Tx lines and senses a voltage change in the touch sensors to output sensing data; and a noise filtering unit that profiles the type of noise in the sensing data and compensates the sensing data so that the sensing data is near the maximum threshold or the minimum threshold, which is calculated based on a average value of the previous frame, or within the range between the maximum and minimum thresholds.

9 Claims, 12 Drawing Sheets

PRIOR ART

ELECTRONIC DEVICE WITH TOUCH SENSOR AND DRIVING METHOD THEREOF

This application claims the benefit of priority to Korea Patent Application No. 10-2013-0105452 filed on Sep. 3, 2013, which is incorporated herein by reference for all purposes as if fully set forth herein.

BACKGROUND

1. Field

This document relates to an electronic device with a touch sensor and a driving method thereof.

2. Related Art

As various types of electronic devices, e.g., home appliances or portable information devices, are becoming more lightweight and slimmer, the user input means is being switched from a button switch to a touch sensor. Accordingly, electronic devices, such as recently launched displays, each have a touch sensor (or touch screen).

A capacitive sensor, a type of touch sensor, detects the presence or absence of a touch and the coordinates of the touch by sensing a change in mutual capacitance when a human finger or conductive material touches or approaches the capacitive sensor. To measure a change in mutual capacitance and assess touch information, the procedure of configuring sensor nodes on the touch screen, outputting a drive signal, sensing a change in the mutual capacitance of the touch screen, and binarizing data is carried out.

The capacitive sensor senses a change in mutual capacitance caused by a human finger or conductive material, classifies a sensed signal as a touch only when the peak level of the sensed signal is at or above a threshold, and submits a touch report.

In order to improve the sensing performance of the touch screen, a noise suppression filter for suppressing the effects of noise is required. A conventional noise filtering algorithm removes impulse noise in sensing data by aligning the sensing data and then deleting (or blanking out) the minimum and maximum values of the aligned data.

The conventional noise filtering algorithm causes a reduction in the number of samples of sensing data because the minimum and maximum values of aligned data are deleted. When the number of samples is reduced, the use of an alignment filter leads to a decrease in signal-to-noise ratio (SNR), which needs to be overcome.

SUMMARY

In one aspect, an electronic device with a touch sensor comprises: a touch screen including touch sensors defined by Tx lines and Rx lines; a touch sensing circuit that supplies a drive signal to the Tx lines and senses a voltage change in the touch sensors to output sensing data; and a noise filtering unit that profiles the type of noise in the sensing data and compensates the sensing data so that the sensing data is near the maximum threshold or the minimum threshold, which is calculated based on a average value of the previous frame, or within the range between the maximum and minimum thresholds.

In another aspect, a driving method of an electronic device with a touch sensor comprises: acquiring sensing data, comparing a average value of the sensing data with a preset touch threshold, determining whether the sensing data is classified as touch or no touch, and setting sensing data classified as touch as a first parameter and sensing data classified as no touch as a second parameter; calculating a reference value, subtracting a average value of the first parameter and a average value of the second parameter, respectively, comparing the resultant values, and determining which of the first and second parameters to apply; calculating the maximum and minimum thresholds for first and second modes based on a average value of the previous frame in order to define data regions classified as noise by using the determined parameter; and comparing the sensing data with the maximum threshold and the minimum threshold, and if the sensing data has a value other than the maximum threshold and the minimum threshold, compensating the sensing data so that the sensing data is near the maximum threshold or the minimum threshold, which is calculated based on the average value of the previous frame, or within the range between the maximum and minimum thresholds.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to embodiments of the invention, examples of which are illustrated in the accompanying drawings.

Hereinafter, concrete exemplary embodiments of the present invention will be described with reference to the accompanying drawings.

Figure 1:
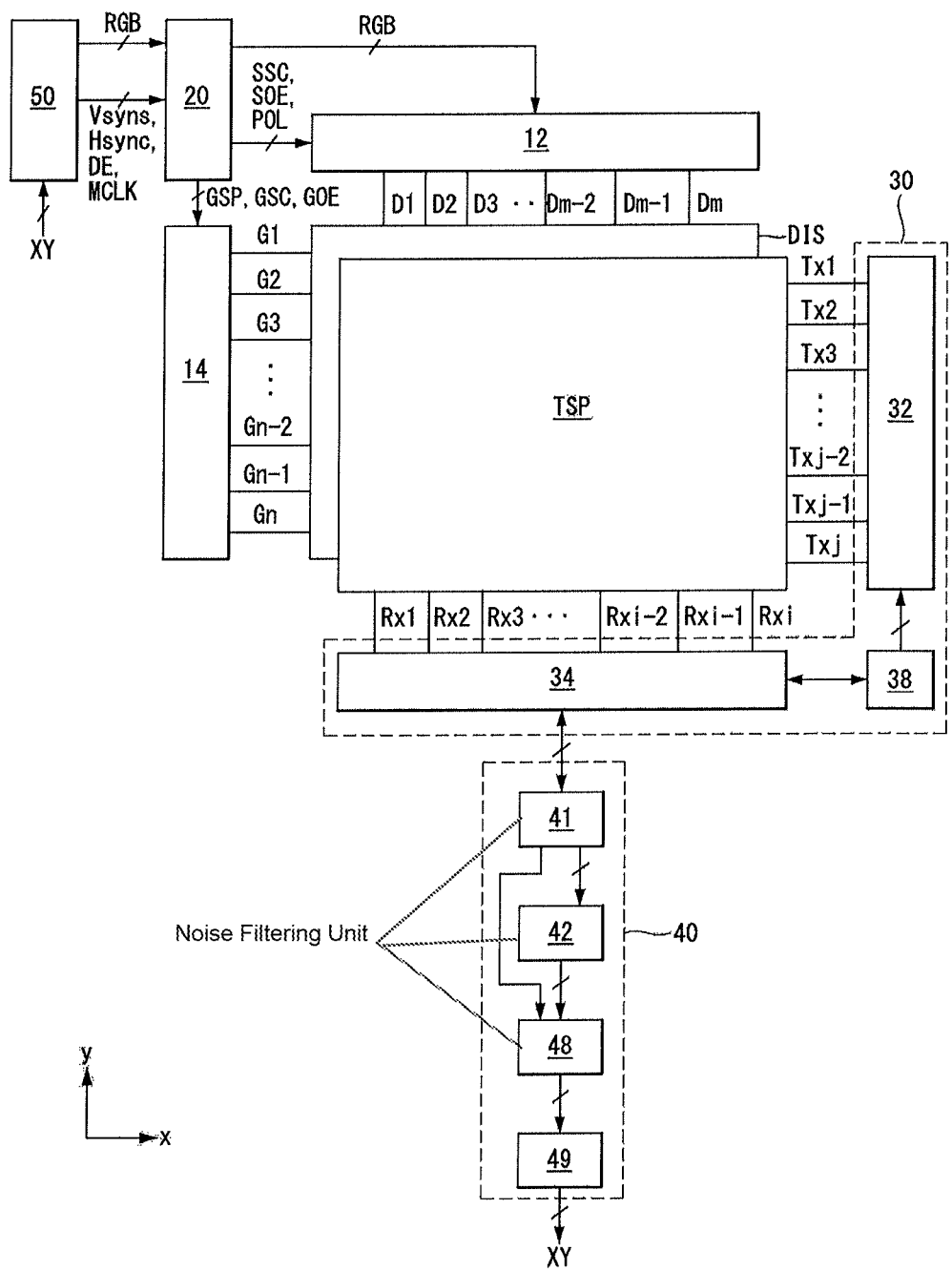
FIG. 1 is a view showing an electronic device with a touch sensor according to an exemplary embodiment of the present invention.
Figure 2:
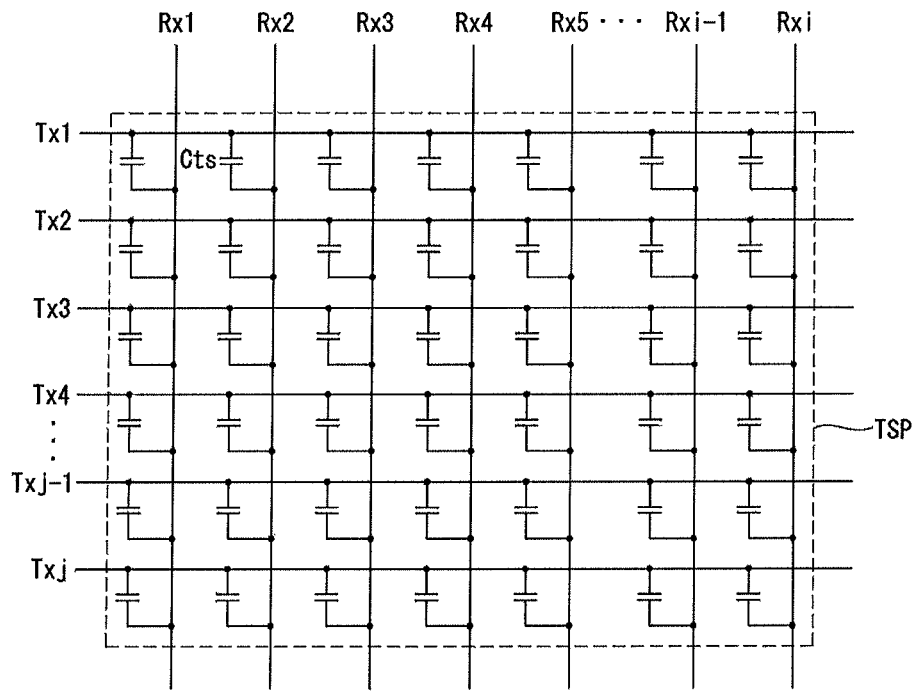
FIG. 2 is an equivalent circuit diagram of the touch screen shown in FIG. 2.
Figure 3:
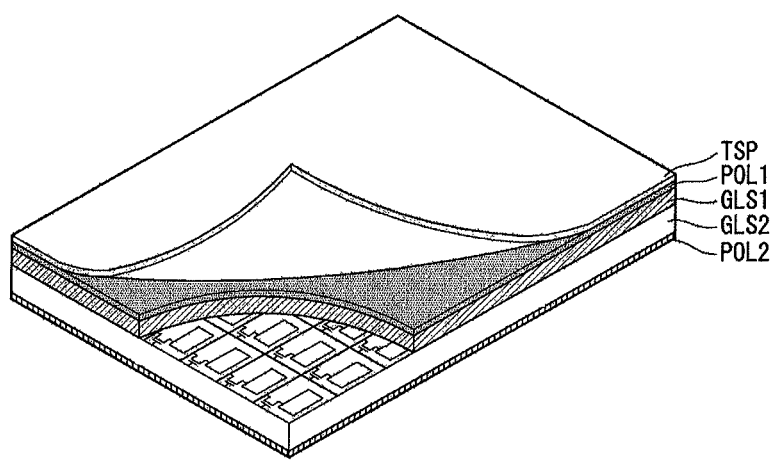
FIGS. 3 to 5 are views showing various combinations of a liquid crystal display panel and a touch screen.
Figure 4:
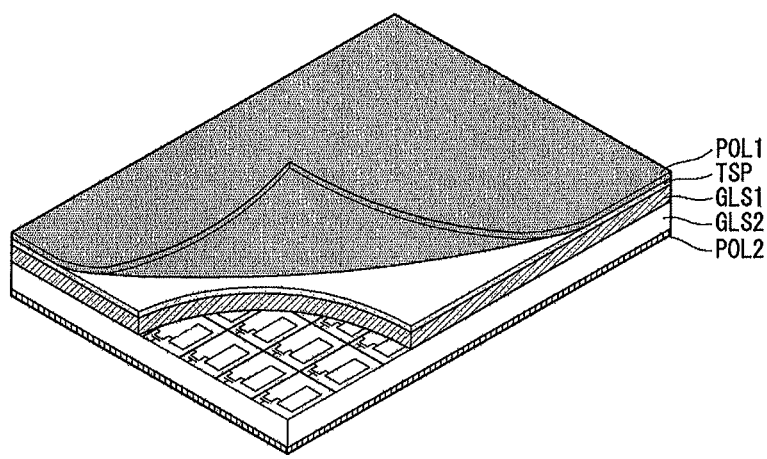
Figure 5:
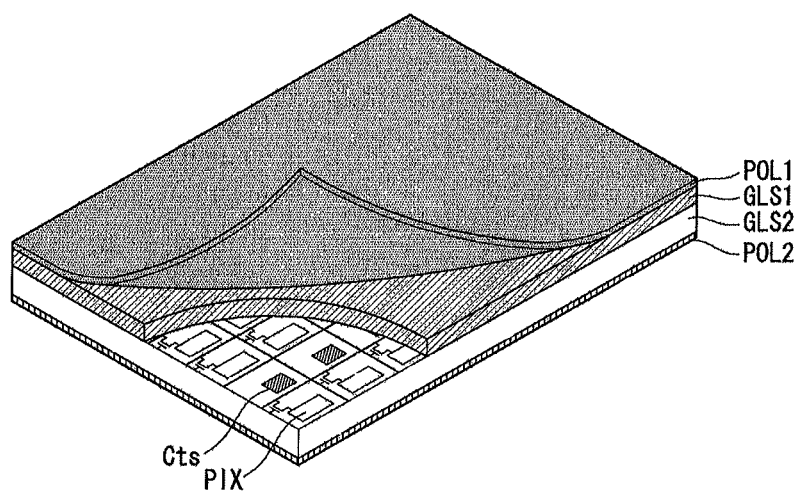

FIG. 1 is a view showing an electronic device with a touch sensor according to an exemplary embodiment of the present invention. FIG. 2 is an equivalent circuit diagram of the touch screen shown in FIG. 2. FIGS. 3 to 5 are views showing various combinations of a liquid crystal display panel and a touch screen.

The electronic device with a touch sensor according to the present invention may be implemented as a television, a set-top box, a navigation system, a video player, a Blue-ray player, a personal computer (PC), a home theater system, a phone system, etc. The electronic device with a touch sensor according to the present invention is implemented on the basis of a display panel. The display panel may be, but not limited, a flat display panel, such as a liquid crystal display panel, an organic electroluminescence display panel, an electrophoretic display panel, or a plasma display panel. The following description will be made by taking a liquid crystal display panel as an example for convenience of explanation.

The electronic device with a touch sensor comprises a host system 50, a timing controller 20, a data drive circuit 12, a scan drive circuit 14, a liquid crystal display panel DIS, a touch screen TSP, and a touch screen drive circuit 30 and 40.

The host system 50 comprises a system on chip (SoC) including a scaler and converts digital video data RGB of an input image into a format suitable for displaying on the display panel DIS. The host system 50 transmits timing signals Vsync, Hsync, DE, and MCLK, along with digital video data, to the timing controller 20. The host system 50 runs an application associated with touch coordinate information XY received from a touch coordinate detector 40.

The timing controller 20 receives timing signals, such as a vertical sync signal Vsync, a horizontal sync signal Hsync, a data enable DE, and a main clock MCLK, from the host system 50, and controls the data drive circuit 12 and the scan drive circuit 14 based on the timing signals.

The timing controller 20 controls the scan drive circuit 14 based on timing control signals such as a gate start pulse GSP, a gate shift clock GSC, a gate output enable signal GOE, etc. The timing controller 20 controls the data drive circuit 12 based on data timing control signals such as a source sampling clock SSC, a polarity control signal POL, a source output enable signal, etc.

The data drive circuit 12 converts digital video data RGB received from the timing controller 20 into positive and negative analog gamma compensation voltages to generate a data voltage. The data drive circuit 12 then supplies the data voltage through data lines D1 to Dm.

The scan drive circuit 14 sequentially generates a gate pulse (or scan pulse) synchronized with the data voltage. The scan drive circuit 14 supplies the gate pulse through gate lines G1 to Gn.

The liquid crystal display panel DIS displays an image based on the gate pulse supplied from the scan drive circuit 14 and the data voltage supplied from the data drive circuit 12. The liquid crystal display panel DIS comprises a liquid crystal layer formed between two substrates GLS1 and GLS2. The liquid crystal display panel DIS may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

Subpixels of the liquid crystal display panel DIS are defined by the data lines D1 to Dm (m is a positive integer) and the gate lines G1 to Gn (n is a positive integer). A subpixel comprises a TFT (thin film transistor) formed at each of the crossings of the data lines and the gate lines, a pixel electrode to be charged with a data voltage, and a storage capacitor Cst connected to the pixel electrode to maintain the voltage of the liquid crystal cell.

A black matrix, color filters, etc may be formed on the upper substrate GLS1 of the liquid crystal display panel DIS. The lower substrate GLS2 of the liquid crystal display panel DIS may be implemented to have a COT (Color filter On TFT) structure. In this case, the color filters may be formed on the lower substrate GLS2 of the liquid crystal display panel DIS. Common electrodes, to which a common voltage is supplied, may be formed on the upper substrate GLS1 or the lower substrate GLS2 of the liquid crystal display panel DIS. Polarizers POL1 and POL2 are respectively attached to the upper and lower substrates GLS1 and GLS2 of the liquid crystal display panel DIS. Alignment layers for setting a pre-tilt angle of liquid crystals are respectively formed on the inner surfaces contacting the liquid crystals in the upper and lower substrates GLS1 and GLS2 of the liquid crystal display panel DIS.

A column spacer is formed between the upper and lower substrates GLS1 and GLS2 of the liquid crystal display panel DIS to keep cell gaps of the liquid crystal cells constant. A backlight unit may be disposed under the lower polarizer POL2 of the liquid crystal display panel DIS. The backlight unit may be implemented as an edge type backlight unit or a direct type backlight unit, and provides light to the liquid crystal display panel DIS.

The touch screen TSP comprises Tx lines Tx1 to Txj (j is a positive integer less than n), Rx lines Rx1 to Rxi (i is a positive integer less than m) crossing the Tx lines Tx1 to Txj, and (i×j) touch sensors formed at the crossings of the Tx lines Tx1 to Txj and the Rx lines Rx1 to Rxi. Each of the touch sensors Cm has a mutual capacitance from an equivalent circuit perspective.

The capacitance may be divided into a self capacitance and a mutual capacitance. The self capacitance is formed along conductor lines of a single layer formed in one direction. The mutual capacitance is formed between two conductor lines perpendicular to each other. In the following description, a mutual capacitive touch screen will be described as an example of the capacitive touch screen. Other types of capacitive touch screens may be used.

As shown in FIG. 3, the touch screen TSP may be placed on the upper polarizer POL1 of the liquid crystal display panel DIS. Alternatively, as shown in FIG. 4, the touch screen TSP may be placed between upper polarizer POL1 and upper substrate GLS1 of the liquid crystal display panel DIS. Alternatively, as shown in FIG. 5, touch sensors Cts of the touch screen TSP may be embedded in the liquid crystal display panel DIS, along with pixel electrodes PIX of the lower substrate GLS2.

The touch screen drive circuit 30 and 40 supplies a drive signal to the touch sensors Cts to sense a change in the voltage of the touch sensors before and after touch input, compares the voltage change with a predetermined touch threshold to determine the presence or absence of a touch, and detects a touch input position. The touch screen drive circuit 30 and 40 calculates the coordinates of the touch input position.

The touch sensing circuit 30 comprises a Tx driving circuit 32, an Rx driving circuit 34, and a Tx/Rx controller 38. The touch sensing circuit 30 uses the Tx drive circuit 32 to apply a drive signal to the touch sensors Cts through the Tx lines Tx1 to Txj, and senses the voltages of the touch sensors Cts through the Rx lines Rx1 to Rxi and the Rx drive circuit 34 in synchronization with the drive signal to output touch raw data. The drive signal may be generated in various forms including a square wave pulse, a sine wave pulse, a triangle wave pulse, etc. The touch sensing circuit 30 may be integrated in a single readout integrated circuit (ROIC).

The Tx drive circuit 32 selects a Tx channel, to which the drive signal will be output, in response to a Tx setup signal from the Tx/Rx controller 38 and applies the drive signal to the Tx lines Tx1 to Txj connected with the selected Tx channel. The Tx lines Tx1 to Txj are charged during a high potential period of the drive signal and supply charges to the touch sensors Cts. The drive signal can be successively supplied to each of the Tx lines Tx1 to Txj, so that the voltages of the touch sensors Cts can be accumulated in a capacitor of an integrator embedded in the Rx drive circuit 34 through the Rx lines Rx1 to Rxj.

The Rx drive circuit 34 selects Rx lines, which will receive the voltages of the touch sensors Cts, in response to an Rx setup signal from the Tx/Rx controller 38, and receives the output voltages of the touch sensors Cts through the selected Rx lines in synchronization with the drive signal and samples them. The Rx drive circuit 34 then accumulates the sampled voltages in a capacitor of the integrator. The Rx drive circuit 34 converts the voltage accumulated in the capacitor into digital data using an analog-to-digital converter (ADC) and outputs the digital data as touch raw data.

The Tx/Rx controller 38 controls the setting of the Tx channel and Rx channel in response to the Tx setup signal and Rx setup signal from the touch coordinate detector 40, and synchronizes the Tx drive circuit 32 with the Rx drive circuit 34.

The touch coordinate detector 40 comprises a data buffer 41, a noise profiler 42, a noise suppressor 48, and a coordinate calculator 49. The touch coordinate detector 40 supplies the Tx setup signal and the Rx setup signal to the Tx/Rx controller 38, and supplies an ADC clock signal for operating the ADC of the Rx drive circuit 34 to the Rx drive circuit 34. The touch coordinate detector 40 may be implemented as a micro controller unit (MCU).

The data buffer 41, the noise profiler 42, and the noise suppressor 48 constitute a noise filtering unit that reduces noise in touch raw data and generates compensated touch raw data in order to improve the sensing performance of the touch screen TSP. A description of the data buffer 41, noise profiler 42, and noise suppressor 48 will be given below.

When noise or the like is filtered by the noise filtering unit, the coordinate calculator 49 calculates the coordinates of the touch raw data based on a baseline. The coordinate calculator 49 compares the touch raw data with a preset touch threshold, and classifies the touch raw data as touch data acquired from the touch sensors Cts only when its value is equal to or greater than the touch threshold. In this manner, the coordinate calculator 49 assigns an identification number to every touch data having a value equal to or greater than the touch threshold, calculates the coordinates of each touch input position, and transmits the identification number and touch coordinate information XY of each touch input position to the host system 50.

Hereinafter, the electronic device with a touch sensor according to the exemplary embodiment of the present invention will be concretely described.

Figure 6:
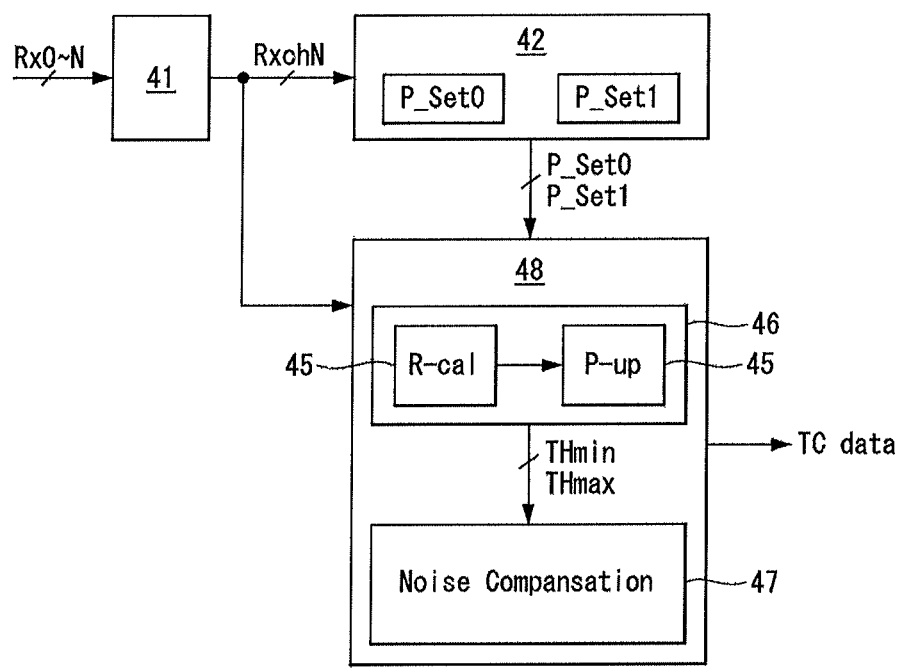
FIG. 6 is a block diagram of the essential parts of the electronic device with a touch sensor according to the exemplary embodiment of the present invention.

FIG. 6 is a block diagram of the essential parts of the electronic device with a touch sensor according to the exemplary embodiment of the present invention.

As shown in FIG. 6, the essential parts of the electronic device with a touch sensor according to the exemplary embodiment of the present invention comprise a data buffer 41, a noise profiler 42, a noise suppressor 48, and a coordinate calculator 49.

The data buffer 41 buffers touch raw data Rx0 to N which is converted into a digital format by the Rx drive circuit 34.

The data buffer 41 sorts touch raw data into different types and buffers it, and acquires current sensing data RxchN for each channel. The touch raw data will hereinafter referred to as sensing data for convenience of explanation.

The data buffer 41 may acquire sensing data RxChN in units of frames.

The noise profiler 42 profiles the type of noise in the sensing data RxChN acquired through the data buffer 41. The noise profiler 42 compares the average value of the sensing data in a channel with a preset touch threshold, and determines whether the sensing data is classified as touch or no touch.

The noise profiler 42 sets sensing data classified as touch as a first parameter P_Set0 and sensing data classified as no touch as a second parameter P_Set1.

The noise profiler 42 uses the following equations to define the first parameter P_Set0 and the second parameter P_Set1 depending on whether sensing data is classified as touch or no touch:

First parameter P_Set0: |"average value of sensing data"|>touch threshold

Second parameter P_Set1: |"average value of sensing data"|<=touch threshold

According to the above equations, if the average absolute value of sensing data is greater than the touch threshold, the sensing data is classified as touch. Thus, the noise profiler 42 sets this sensing data as the first parameter P_Set0. On the other hand, if the average absolute value of sensing data is less than or equal to the touch threshold, the sensing data is classified as no touch. Thus, the noise profiler 42 sets this sensing data as the second parameter P_Set1.

The noise profiler 42 defines the state parameters of the current frame as above depending on the presence or absence of a touch, and updates them. The noise profiler 42 defines and updates the state parameters of the current frame as above depending on the presence or absence of a touch each time sensing data is input.

The noise suppressor 48 comprises a parameter controller 46 and a noise compensator 47. The parameter controller 46 comprises a reference value calculator 44 and a parameter determiner 45.

The noise suppressor 48 having the above-explained components defines the range within which data regions are classified as noise, by using the first parameter P_Set0 and the second parameter P_Set1. If any sensing data is out of the defined range, the sensing data is compensated so that it is near the maximum threshold or the minimum threshold or within the range between them, and the compensated sensing data is output.

The reference value calculator 44 calculates a reference value RefData by using N samples of sensing data (N is an integer equal to or greater than 2). The reference value calculator 44 may use N pieces of sensing data acquired during an engineering stage or initial driving of the device as the samples for calculating the reference value RefData. The reference value RefData may be, but not limited to, the median value, average value, etc of sensing data used as the samples.

The parameter determiner 45 subtracts the average value of the first parameter P_Set0 and the average value of the second parameter P_Set1, respectively, from the reference value RefData from the reference value calculator 44, compares the resultant values, and determines which of the first and second parameters P_Set0 and P_Set1 to apply. After determining which of the first and second parameters P_Set0 and P_Set1 will be applied, the parameter determiner 45 defines data regions classified as noise by using the determined parameter.

The parameter determiner 45 calculates the maximum and minimum thresholds THmax and THmin for first and second modes in order to define data regions classified as noise by using the determined parameter, and updates them every frame. The parameter determiner 45 may use the following equations to calculate the maximum and minimum thresholds THmax and THmin for the first and second modes:

[Maximum and Minimum Thresholds for First Mode]
1. Maximum threshold: average value of previous frame+ average value of previous frame*gain
2. Minimum threshold: average value of previous frame− average value of previous frame*gain

[Maximum and Minimum Thresholds for Second Mode]
1. Maximum threshold: average value of previous frame− average value of previous frame*gain
2. Minimum threshold: average value of previous frame− average value of previous frame*gain The parameter determiner 45 may set a gain range when calculating the maximum threshold THmax and the minimum threshold THmin and multiply the calculated thresholds by a gain. The compensation degree of sensing data varies depending on the gain range multiplied by the calculated thresholds, and may be expressed as either as a numerical value within a specific range or as a percentage.

The noise compensator 47 compares the sensing data RxChN with the maximum and minimum thresholds THmax and THmin to find out whether the sensing data RxChN is less or greater than the maximum threshold THmax or the minimum threshold THmin. If the sensing data RxChN is less or greater than the maximum threshold THmax or the minimum threshold THmin, the noise compensator 47 compensates the sensing data RxChN by a gain and outputs compensated sensing data (TC data).

The noise compensator 47 may perform the procedure of comparing the sensing data RxChN with the maximum threshold THmax and the minimum threshold THmin and compensating the sensing data RxChN so that the sensing data is near the maximum threshold THmax or the minimum threshold THmin or within the range between the maximum and minimum thresholds THmax and THmin M times (M is an integer equal to or greater than 1) or more. However, if the compensation value for compensating the sensing data is less or greater than the average value, the noise compensator 47 may not perform the compensation any longer but instead may interrupt the compensation routine.

Hereinafter, a comparative explanation of the present invention and the conventional art will be given.

Figure 7:
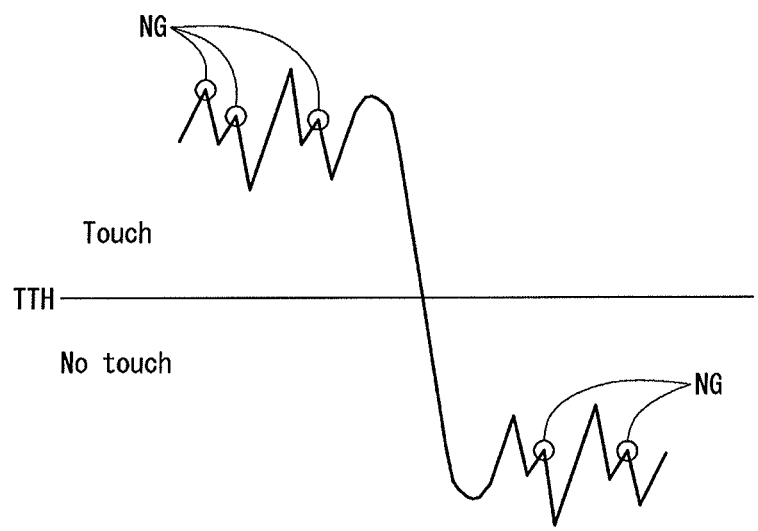
FIG. 7 is an illustration of sensing data.
Figure 8:
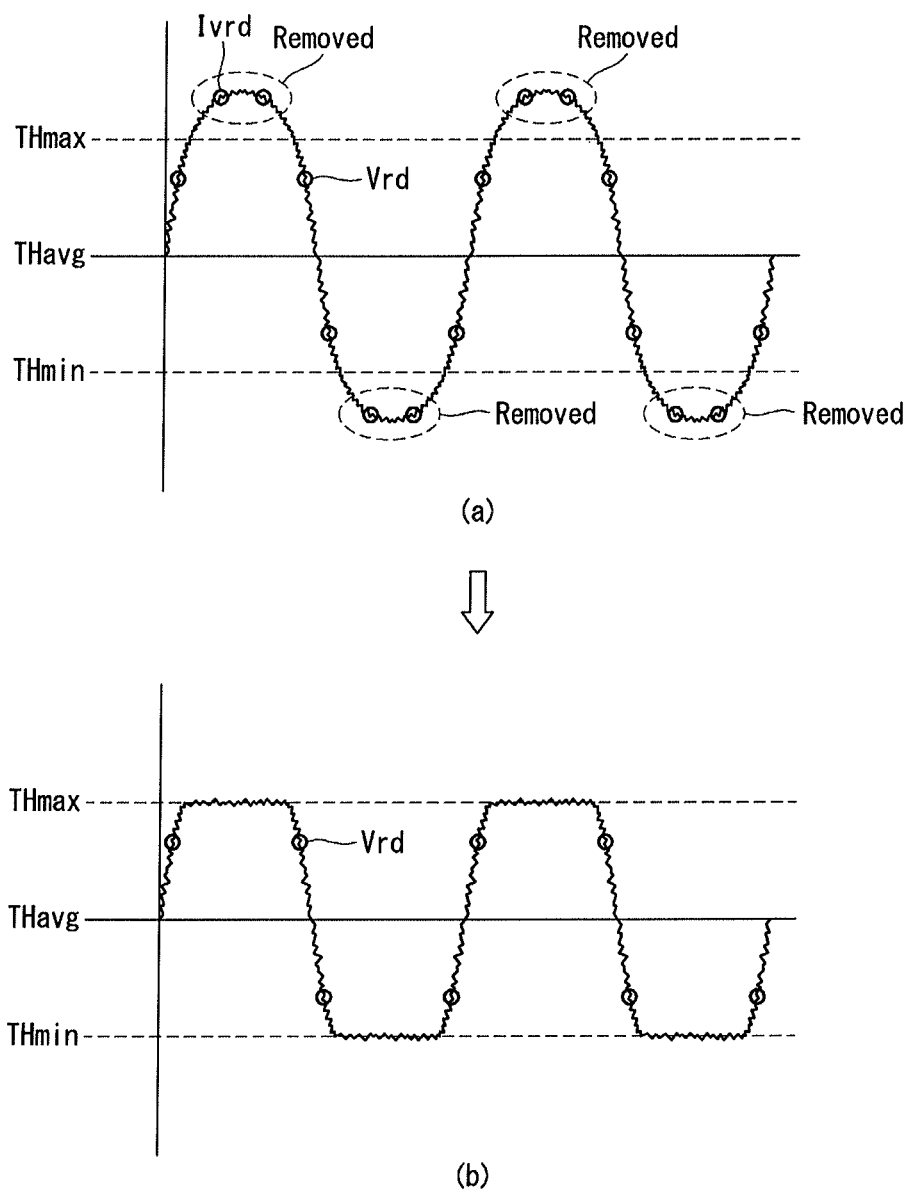
FIG. 8 is an illustration for schematically explaining the concept of noise filtering according to the conventional art.
Figure 9:
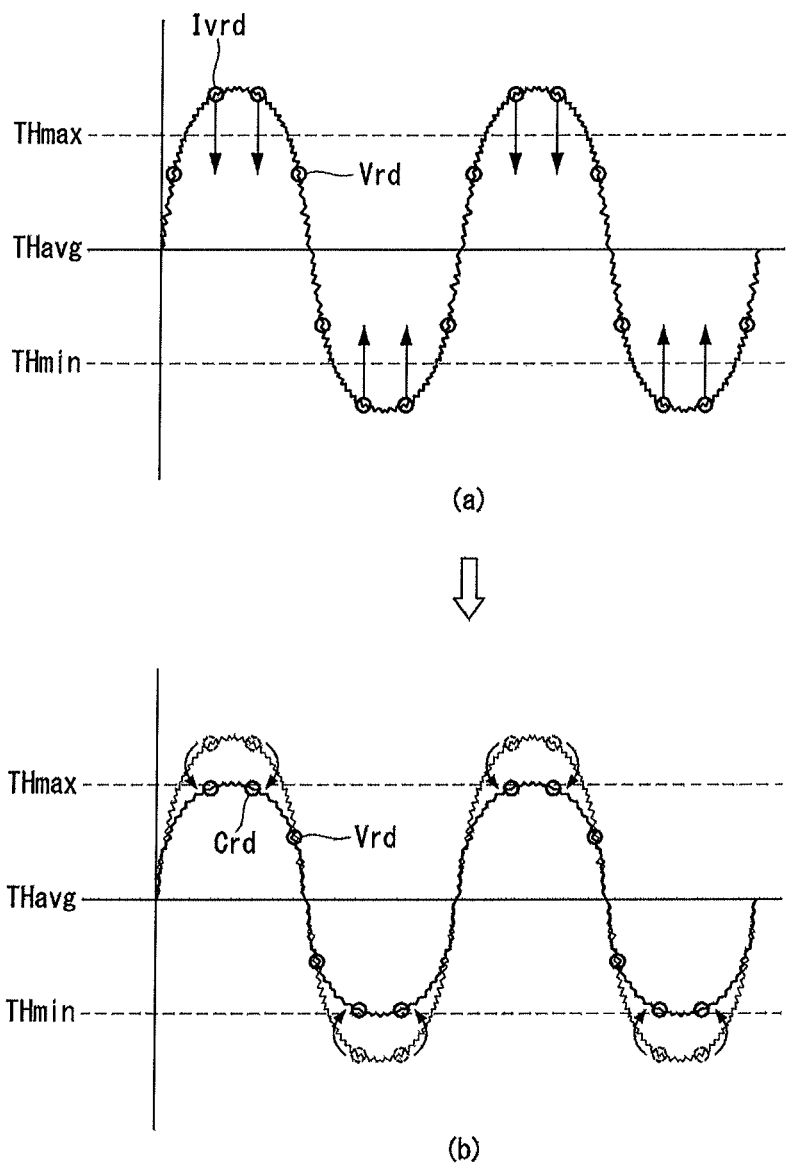
FIG. 9 is an illustration for schematically explaining the concept of noise filtering according to the exemplary embodiment of the present invention.
Figure 10:
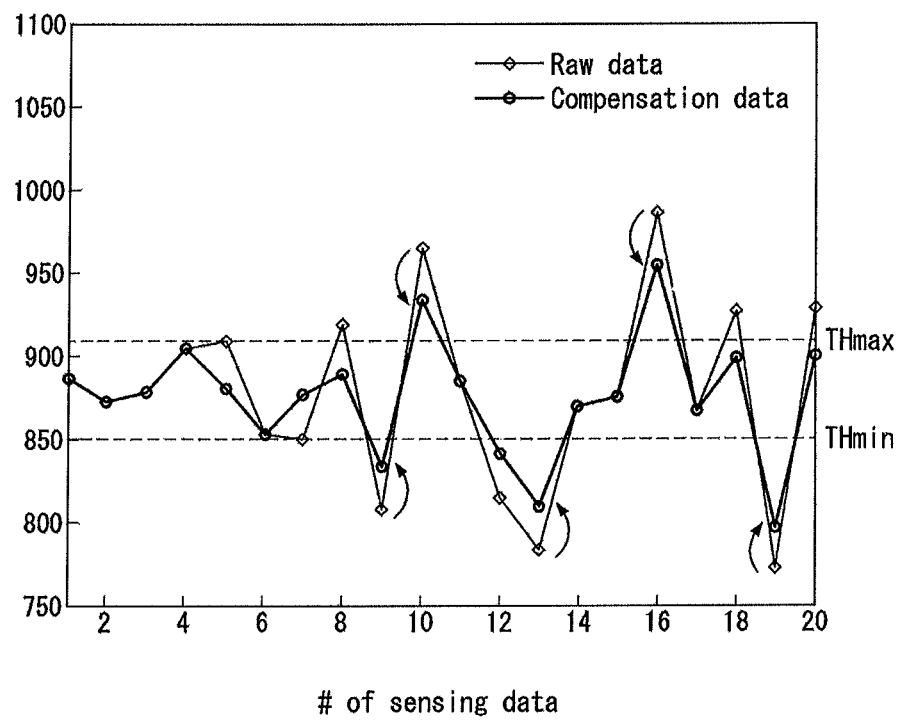
FIG. 10 is a graph of a test result using noise filtering according to the exemplary embodiment of the present invention.

FIG. 7 is an illustration of sensing data. FIG. 8 is an illustration for schematically explaining the concept of noise filtering according to the conventional art. FIG. 9 is an illustration for schematically explaining the concept of noise filtering according to the exemplary embodiment of the present invention. FIG. 10 is a graph of a test result using noise filtering according to the exemplary embodiment of the present invention.

Sensing data received through the Rx drive circuit is expressed as shown in FIG. 9. The sensing data is divided into a touch region and a no-touch region with respect to a predetermined touch threshold TTH. Noise components NG exist in the touch region and no-touch region of the sensing data.

The noise components NG existing in the sensing data deteriorates the sensing performance of the touch screen. Accordingly, it is necessary to reduce the effects of the noise components NG in order to improve the touch sensing performance. Conventionally, a noise filtering algorithm such as an FIR (finite impulse response) filter, IIR (infinite impulse response) filter, or a median filter was used to reduce the effects of the noise components NG.

Among them, the FIR and IRR filters are linear filters, and advantageous in that they can uniformly reduce the filter's effect in every noise environment but disadvantageous in that they show low noise suppression performance for impulse noise. Also, the median filter has low complexity but its performance depends largely on environment. Therefore, the conventional FIR, IIR, and median filters have the disadvantage of a decrease in the final number of commonly filtered data samples by the "number of taps/2".

[Concept of Conventional Noise Filtering]
As shown in FIG. 8, in a conventional noise filtering method, the maximum threshold THmax and minimum threshold THmin of sensing data are set with respect to the average threshold THavg of the sensing data. Any sensing data Ivrd beyond the maximum threshold THmax and the minimum threshold THmin is classified as noise and removed. Next, an algorithm for calculating coordinate data is implemented by using only the sensing data Vrd existing between the maximum threshold THmax and the minimum threshold THmin.

The conventional noise filtering method is disadvantageous in that performance depends largely on the number of sensing data samples because of its structural feature that reduces sensing data. For example, an increase in the total number of sensing channels within the touch screen leads to a relative lack of per-channel sensing time. Accordingly, if there are only three sensing data samples per channel, only one data sample is used to produce coordinate data. As a consequence, using the conventional noise filtering method brings about a decrease in the noise filtering effect when performing data alignment and filtering techniques like data averaging to produce coordinate data. Therefore, the conventional noise filtering method has the structural limitation that a sufficient number of sensing data samples needs to be obtained to get a stable filtering effect.

[Concept of Noise Filtering According to Exemplary Embodiment of Present Invention]
As shown in FIG. 9, in a noise filtering method according the exemplary embodiment of the present invention, the maximum threshold THmax and minimum threshold THmin of sensing data are set with respect to the average threshold THavg of the sensing data. If there is any data Ivrd beyond the maximum threshold THmax and the minimum threshold THmin, the data Ivrd is compensated so that it is near the maximum threshold or the minimum threshold or within the range between the maximum and minimum thresholds. That is, the sensing data Ivrd beyond the maximum threshold THmax and the minimum threshold THmin is compensated so as to be near the sensing data Vrd existing between the maximum threshold THmax and the minimum threshold THmin and included in data averaging which is performed to produce coordinate data.

For a noise filtering test result related to the noise filtering method according to the exemplary embodiment of the present invention, refer to the graph of FIG. 10. In FIG. 10, '# of sensing data' is the number of sensing data samples, 'raw data' is sensing data before compensation, and 'compensation data' is sensing data after compensation. Since the test result shown in FIG. 10 represents only some sensing data that is compensated at a specific session, 'raw data', i.e., sensing data before compensation gets near a desired range or exists within this range if the compensation process is further carried out.

In the noise filtering method according to the exemplary embodiment of the present invention, the performance does not depend largely on the number of sensing data samples because sensing data is located as near the average threshold THavg as possible without being reduced. For example, an increase in the total number of sensing channels within the touch screen leads to a relative lack of per-channel sensing time. Accordingly, even if there are only three sensing data samples per channel, the same or similar number of data samples can be used to produce coordinate data through compensation. As a consequence, using the noise filtering method according to the exemplary embodiment of the present invention contributes to less data loss and therefore prevents a decrease in the noise filtering effect when performing data alignment and filtering techniques like data averaging to produce coordinate data. Therefore, the noise filtering method according to the exemplary embodiment of the present invention can enhance signal-to-noise ratio (SNR) even under an environment where there are only a few sensing data samples, as compared to the conventional noise filtering method.

Hereinafter, a driving method of an electronic device with a touch sensor according to an exemplary embodiment of the present invention will be described.

Figure 11:
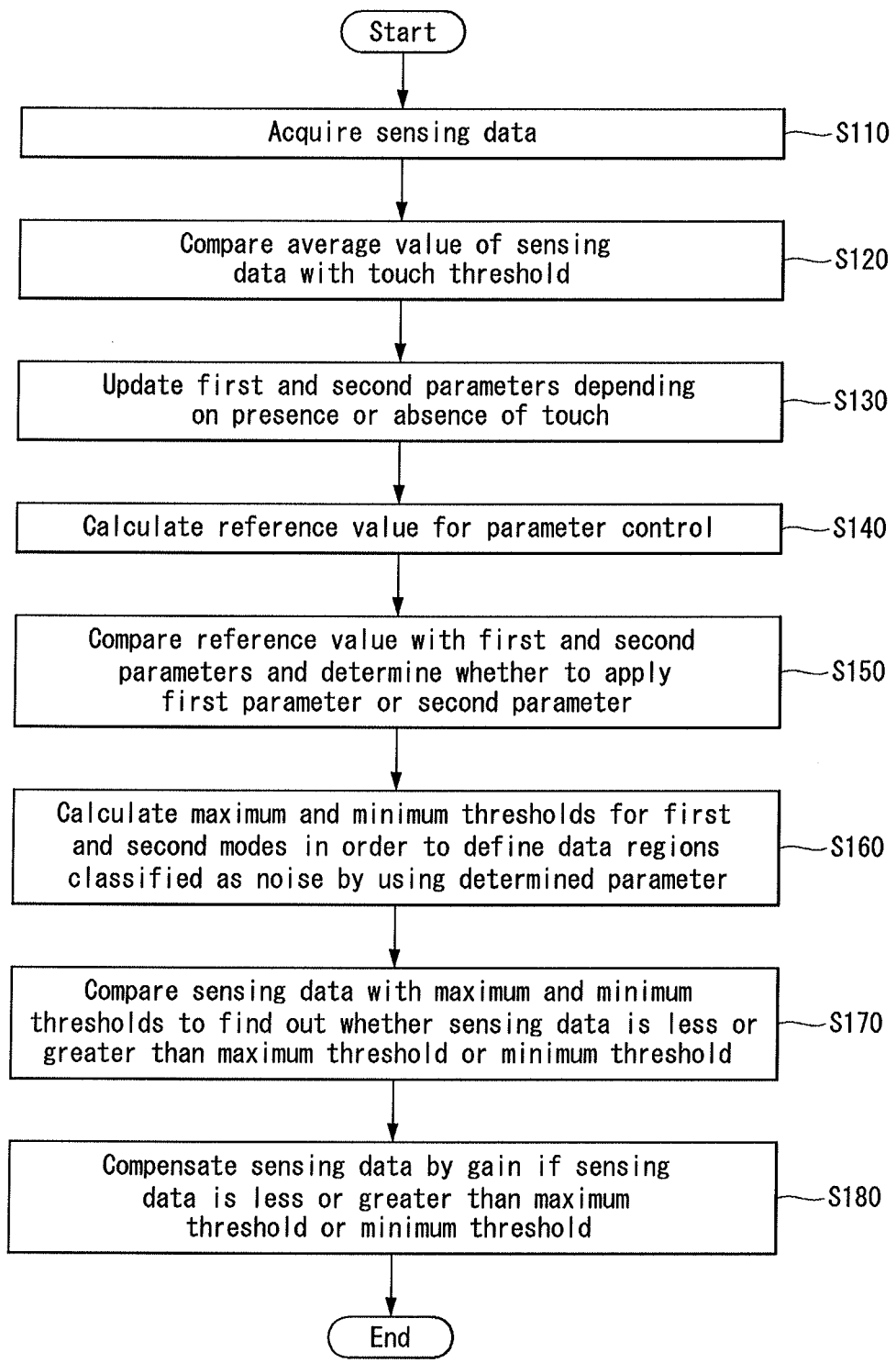
FIG. 11 is a flowchart for schematically explaining a driving method of an electronic device with a touch sensor according to an exemplary embodiment of the present invention.
Figure 12:
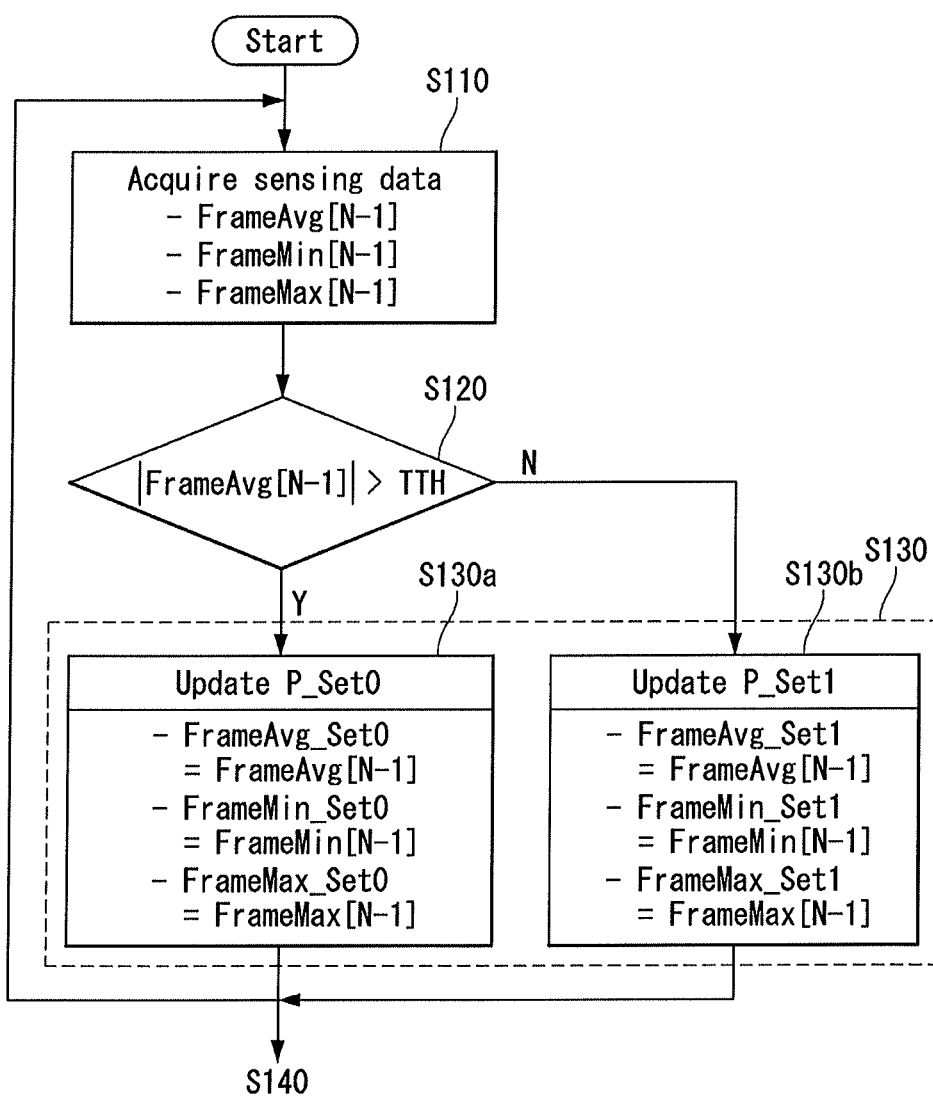
FIGS. 12 to 14 are flowcharts partially embodying the driving method of FIG. 11.
Figure 13:
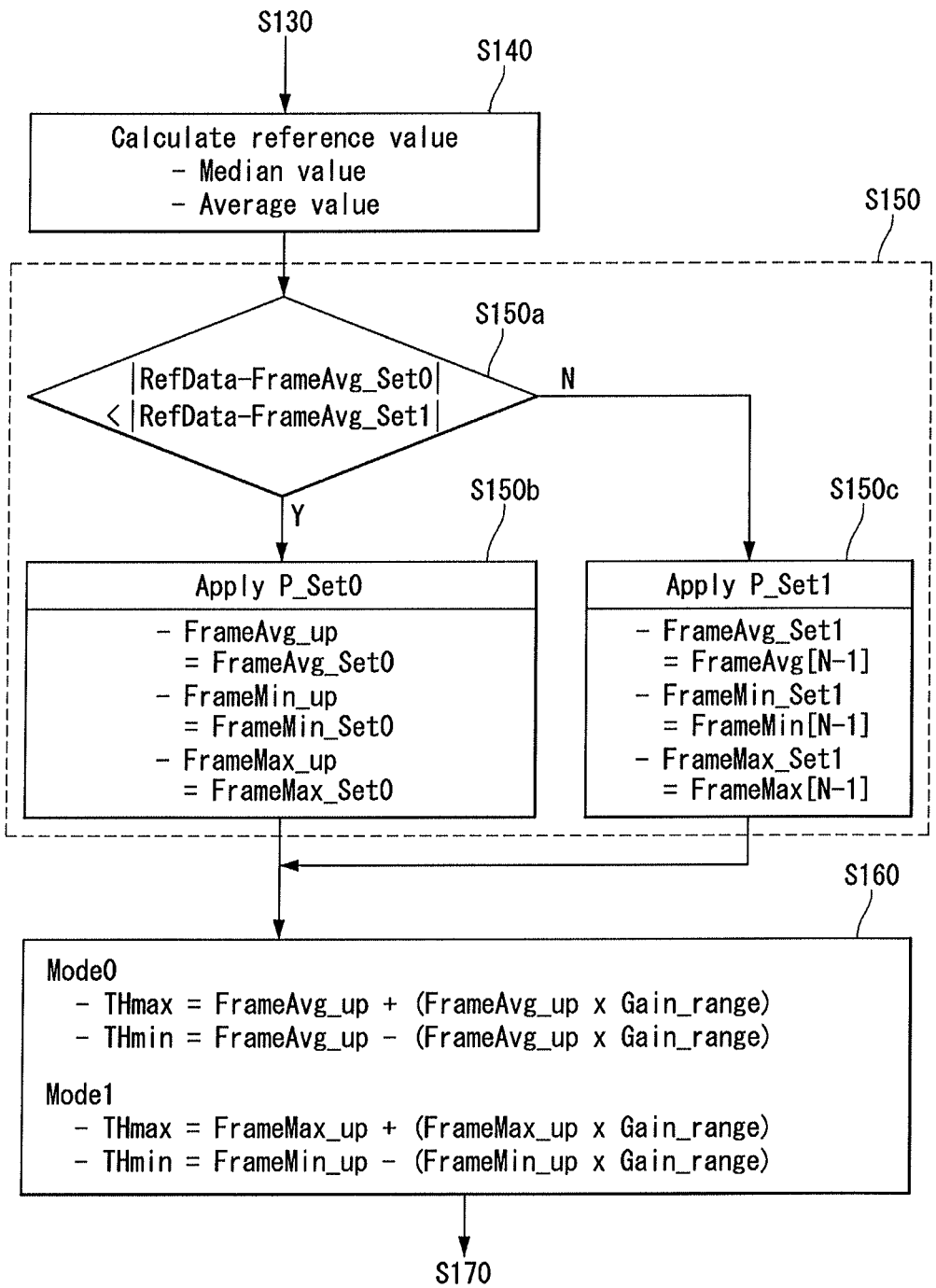
Figure 14:
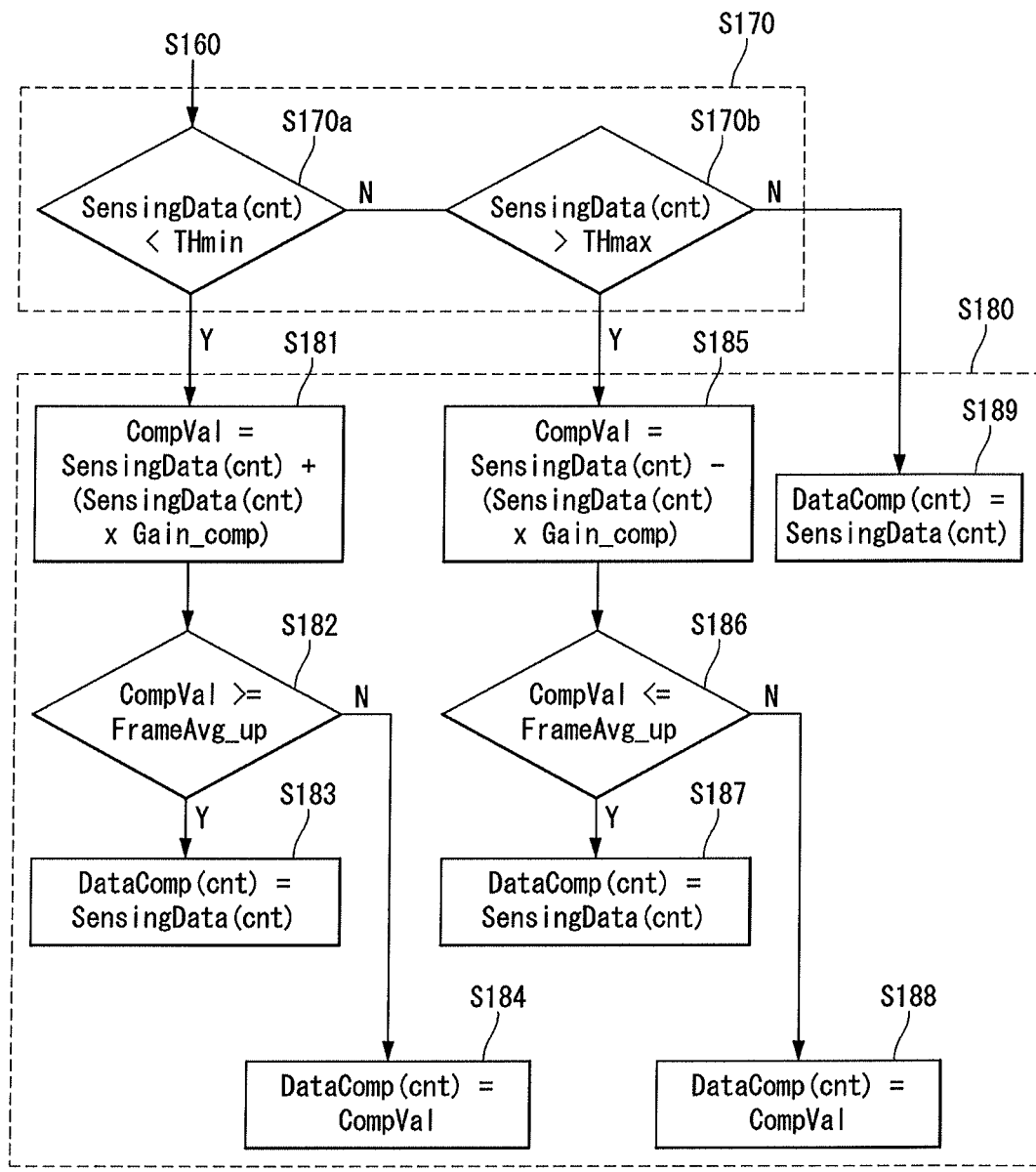

FIG. 11 is a flowchart for schematically explaining a driving method of an electronic device with a touch sensor according to an exemplary embodiment of the present invention. FIGS. 12 to 14 are flowcharts partially embodying the driving method of FIG. 11.

As shown in FIGS. 11 to 14, in the driving method of an electronic device with a touch sensor according to the exemplary embodiment of the present invention, noise filtering is implemented by acquiring frame sensing data first and then compensating the sensing data by a gain. Hereinafter, refer to FIGS. 1 to 10 to help understanding.

Sensing data is acquired (S110). This step is performed by the data buffer 41. The data buffer 41 sorts the sensing data into different types and buffers it, and acquires current sensing data for each channel. The data buffer 41 may acquire sensing data for each channel in units of frames.

In this step, the data buffer 41 acquires the average value FrameAvg[N−1] of frame sensing data, the minimum value FrameMin[N−1] of the frame sensing data, and the maximum value FrameMax[N−1] of the frame sensing data.

The average value FrameAvg[N−1] of the sensing data is compared with a touch threshold TTH (S120). This step is performed by the noise profiler 42. The noise profiler 42 profiles the type of noise in the sensing data RxChN acquired through the data buffer 41. The noise profiler 42 compares the average value of the sensing data in a channel with a preset touch threshold, and determines whether the sensing data is classified as touch or no touch. The noise profiler 42 sets sensing data classified as touch as a first parameter P_Set0 and sensing data classified as no touch as a second parameter P_Set1.

The noise profiler 42 uses the following equations to define the first parameter P_Set0 and the second parameter P_Set1 depending on whether sensing data is classified as touch or no touch:

First parameter P_Set0: |"average value of sensing data"|>touch threshold

Second parameter P_Set1: |"average value of sensing data"|<=touch threshold

According to the above equations, if the average absolute value of sensing data is greater than the touch threshold, the sensing data is classified as touch. Thus, the noise profiler 42 sets this sensing data as the first parameter P_Set0. On the other hand, if the average absolute value of sensing data is less than or equal to the touch threshold, the sensing data is classified as no touch. Thus, the noise profiler 42 sets this sensing data as the second parameter P_Set1.

The first and second parameters P_Set0 and P_Set1 are updated depending on the presence or absence of a touch (S130). This step is performed by the noise profiler 42. If the average value FrameAvg[N−1] is greater than the touch threshold TTH (Y), the noise profiler 42 updates the first parameter P_Set0 (S130a). On the other hand, if the average value FrameAvg[N−1] is less than the touch threshold TTH (N), the noise profiler 42 updates the second parameter P_Set0 (S130b).

In this step, the state parameters of the current frame are defined and updated depending on the presence or absence of a touch each time sensing data is input.

A reference value RefData for parameter control is calculated (S140). This step is performed by the reference value calculator 44. The reference value calculator 44 calculates a reference value RefData by using N samples of sensing data (N is an integer equal to or greater than 2). The reference value calculator 44 may use N pieces of sensing data acquired during an engineering stage or initial driving of the device as the samples for calculating the reference value RefData. The reference value RefData may be, but not limited to, the median value, average value, etc of sensing data used as the samples.

In this step, the reference value RefData for parameter control is calculated. The calculated reference value RefData may be fixed or re-calculated for each repetition of a specific number of frames.

The reference value RefData is compared with the first and second parameters P_Set0 and P_Set1, and whether to apply the first parameter P_Set0 or the second parameter P_Set1 is determined (S150). This step is performed by the parameter determiner 45. The parameter determiner 45 subtracts the average value of the first parameter P_Set0 and the average value of the second parameter P_Set1, respectively, from the reference value RefData from the reference value calculator 44, compares the resultant values, and determines which of the first and second parameters P_Set0 and P_Set1 to apply (S150a).

The parameter determiner 45 compares |RefData−FrameAvg_Set0| with |RefData−FrameAvg_Set1|, and if |RefData−FrameAvg_Set1| is greater, applies the first parameter P_Set0 (S150b). Upon determining to apply the first parameter P_Set0, the average value FrameAvg[N−1] of the frame sensing data, the minimum value FrameMin[N−1] of the frame sensing data, and the maximum value FrameMax[N−1] of the frame sensing data are updated to the values FrameAvg_Set0, FrameMin_Set0, and frameMax_Set0 included in the first parameter P_Set0.

The parameter determiner 45 compares |RefData−FrameAvg_Set0| with |RefData FrameAvg_Set1|, and if |RefData−FrameAvg_Set0| is greater, applies the first parameter P_Set1 (S150c). Upon determining to apply the second parameter P_Set1, the average value FrameAvg[N−1] of the frame sensing data, the minimum value FrameMin[N−1] of the frame sensing data, and the maximum value FrameMax[N−1] of the frame sensing data are updated to the values FrameAvg_Set1, FrameMin_Set1, and frameMax_Set1 included in the second parameter P_Set1.

Once the parameter to be applied is determined, the maximum and minimum thresholds THmax and THmin for first and second modes are calculated in order to define data regions classified as noise by using the determined parameter (S160). This step is performed by the parameter determiner 45. After determining which of the first and second parameters P_Set0 and P_Set1 will be applied, the parameter determiner 45 defines data regions classified as noise by using the determined parameter.

The parameter determiner 45 calculates the maximum and minimum thresholds THmax and THmin for the first and second modes Mode0 and Mode1, and updates them every frame. The parameter determiner 45 uses the following equations to calculate the maximum and minimum thresholds THmax and THmin for the first and second modes Mode0 and Mode1:

[Maximum and Minimum Thresholds for First Mode]
1. THmax: FrameAvg_up+(FrameAvg_up*Gain_range)
2. THmin: FrameAvg_up−(FrameAvg_up*Gain_range)
[Maximum and Minimum Thresholds for Second Mode]
1. THmax: FrameMax_up−(FrameMax_up*Gain_range)
2. THmin: FrameMin_up+(FrameMin_up*Gain_range)

The parameter determiner 45 may set a gain range Gain_range when calculating the maximum threshold THmax and the minimum threshold THmin and multiply the calculated thresholds by a gain. The compensation degree of sensing data varies depending on the gain range Gain_range multiplied by the calculated thresholds, and may be expressed as either as a numerical value within a specific range or as a percentage.

The sensing data SensingData is compared with the maximum and minimum thresholds THmax and THmin to find out whether the sensing data SensingData is less or greater than the maximum threshold THmax or the minimum threshold THmin (S170). This step is performed by the noise compensator 47. If the sensing data SensingData is less or greater than the maximum threshold THmax or the minimum threshold THmin, the noise compensator 47 compensates the sensing data SensingData by a gain (S180).

The sensing data SensingData is compared with the minimum threshold THmin (S170a). If the minimum threshold THmin is greater than the sensing data SensingData (Y), the compensation value CompVal equals sensing data SensingData+(sensing data SensingData*gain Gain_comp) (S181).

Afterwards, the compensation value CompVal is compared with the average value FrameAvg_up of the previous frame (S182). If the compensation value CompVal is greater than or equal to the average value FrameAvg_up of the previous frame (Y), the data compensation value DataComp equals the sensing data SensingData (S183). That is, the sensing data SensingData is not compensated. Unless the compensation value CompVal is greater than or equal to the average value FRameAvg_up of the previous frame (N) as a result of comparison of the compensation value CompVal and the average value FrameAvg_up of the previous frame (S182), the data compensation value DataComp equals the compensation value CompVal (S184). That is, the sensing data SensingData is compensated.

Meanwhile, the sensing data SensingData is compared with the maximum threshold THmax (S170b). If the maximum threshold THmax is greater than the sensing data SensingData (Y), the compensation value CompVal equals sensing data SensingData−(sensing data SensingData*gain Gain_comp) (S185).

Afterwards, the compensation value CompVal is compared with the average value FrameAvg_up of the previous frame (S186). If the compensation value CompVal is less than or equal to the average value FRameAvg_up of the previous frame (Y), the data compensation value DataComp equals the sensing data SensingData (S187). That is, the sensing data SensingData is not compensated. Unless the compensation value CompVal is less than or equal to the average value FrameAvg_up of the previous frame (N) as a result of comparison of the compensation value CompVal and the average value FrameAvg_up of the previous frame (S186), the data compensation value DataComp equals the compensation value CompVal (S188). That is, the sensing data SensingData is compensated.

However, in the step of comparing the sensing data SensingData with the maximum threshold THmax and the minimum threshold THmin to find out whether the sensing data SensingData is less or greater than the maximum threshold THmax or the minimum threshold THmin, unless the sensing data SensingData is less or greater than the maximum threshold THmax or the minimum threshold THmin, the data compensation value DataCop equals the sensing data SensingData (S189). That is, the sensing data SensingData is not compensated.

The sensing data compensation step performed by the noise compensator 47 is implemented to correspond to the number SensingData(cnt) of sensing data samples, and the compensation process may be repeated M times (M is an integer equal to or greater than 1) or more.

The noise compensator 47 may perform the procedure of comparing the sensing data RxChN with the maximum threshold THmax and the minimum threshold THmin and compensating the sensing data RxChN so that the sensing data is near the maximum threshold THmax or the minimum threshold THmin or within the range between them M times (M is an integer equal to or greater than 1). However, if the compensation value for compensating the sensing data by an increment or decrement is less than or greater than the average value, the noise compensator 47 may not perform the compensation any longer but instead may interrupt the compensation routine.

Figure 15:
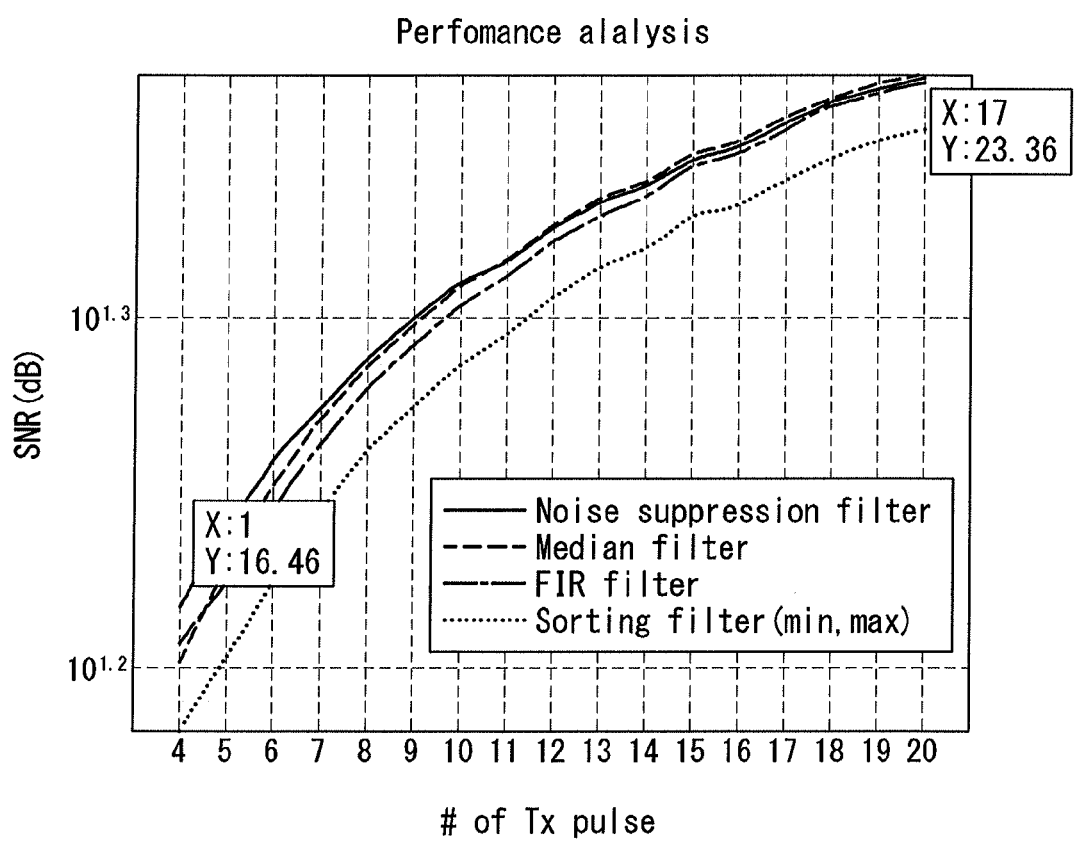
FIG. 15 is a graph showing the simulated performance analysis of the noise filter according to the exemplary embodiment of the present invention and the conventional filters.

FIG. 15 is a graph showing the simulated performance analysis of the noise suppression filter according to the exemplary embodiment of the present invention and the conventional filters.

In the present invention, the performance of each filter versus the number of sensing data samples was comparatively analyzed while increasing the number of drive signals (# of TX pulses) supplied to the Tx lines for performance analysis, that is, the number of sensing data samples per channel, from 4 to 20. Performance measurement was done by using the following signal-to-noise equation (SNRstd):

$$SNR_{std}(dB) = 20\log_{10}\left(\frac{\text{mean}(Touch_{500\ frame}) - \text{mean}(NoTouch_{500\ frame})}{\max[std(NoTouch_{500\ frame}), std(Touch_{500\ frame})]}\right) \quad \text{Equation}$$

As shown in FIG. 15, the simulation result showed that the SNR performance of the noise suppression filter according to the exemplary embodiment of the present invention was 0.2 to 1 dB higher compared to the FIR filter and the median filter in all regions.

By the way, the noise suppression filter according to the exemplary embodiment of the present invention and a sorting filter suggested by Company C differed in performance depending on the number of sensing data samples. If the number of sensing data samples is equal to or less than 10, the performance of the noise suppression filter according to the exemplary embodiment of the present invention was up to 0.1 dB higher compared to the sorting filter suggested by Company C. On the other hand, if the number of sensing data samples is 11, the performance of the noise suppression filter according to the exemplary embodiment of the present invention was up to 0.1 dB lower compared to the sorting filter suggested by Company C.

As can be seen from the simulation, it can be concluded that the noise suppression filter according to the exemplary embodiment of the present invention is relatively robust against noise in an environment where there are only a few samples, compared to other types of noise filters and has better SNR.

As described above, the present invention can decrease the complexity of the circuit and algorithm, provide robustness again noise in an environment where there are only a few sensing data samples, and get better SNR.

What is claimed is:

1. An electronic device with a touch sensor, the electronic device comprising:
    a touch screen including touch sensors defined by Tx lines and Rx lines;
    a touch sensing circuit that supplies a drive signal to the Tx lines and senses a voltage change in the touch sensors to output sensing data; and
    a microcontroller executing program instructions stored in a memory, which is configured to perform noise filtering, which;
        profile a type of noise in the sensing data in order to compensate the sensing data so that the compensated sensing data is near a maximum threshold or a minimum threshold which is calculated based on an average value of the sensing data of a previous frame, or within a range between the maximum and the minimum thresholds;
        compare the average value of the sensing data with a preset touch threshold, determine whether the sensing data is classified as touch or no touch, and set sensing data classified as touch being a first parameter and set sensing data classified as no touch being a second parameter.

2. The electronic device of claim 1, wherein the microcontroller is configured to:
    calculate a reference value by using N samples of sensing data (N is an integer equal to or greater than 2); and
    subtract an average value of the first parameter and an average value of the second parameter, respectively, from the reference value, compare resultant values from the respective subtractions to determine which of the first and the second parameters to apply, and define data regions classified as noise by using the determined parameter.

3. The electronic device of claim 2, wherein the microcontroller is configured to calculate the maximum and minimum thresholds for first and second modes in order to define data regions classified as noise by using the determined parameter, and update the maximum and minimum thresholds every frame.

4. The electronic device of claim 3, wherein the maximum threshold for the first mode is calculated by a first equation: average value of previous frame+average value of previous frame*gain,
    the minimum threshold for the first mode is calculated by a second equation: average value of previous frame−average value of previous frame*gain,
    the maximum threshold for the second mode is calculated by the second equation: average value of previous frame−average value of previous frame*gain, and
    the minimum threshold for the second mode is calculated by the second equation: average value of previous frame−average value of previous frame*gain.

5. The electronic device of claim 1, wherein the microcontroller is configured to compare the sensing data with the maximum threshold and the minimum threshold, and if the sensing data has a value other than the maximum threshold and the minimum threshold, compensate the sensing data.

6. The electronic device of claim 5, wherein the microcontroller is configured to compare the sensing data with the maximum threshold and the minimum threshold and compensate the sensing data so that the sensing data is near the maximum threshold, near the minimum threshold or within the range between the maximum and minimum thresholds M times (M is an integer equal to or greater than 1) or more.

7. A driving method of an electronic device with a touch sensor, the method comprising:
    acquiring sensing data, comparing an average value of the sensing data with a preset touch threshold, determining whether the sensing data is classified as touch or no touch, and setting sensing data classified as touch being a first parameter and sensing data classified as no touch being a second parameter;
    calculating a reference value, subtracting an average value of the first parameter and an average value of the second parameter, respectively, comparing resultant values from the respective subtractions, and determining which of the first and the second parameters to apply;
    calculating a maximum and minimum thresholds for first and second modes based on an average value of the sensing data of the previous frame in order to define data regions classified as noise by using the determined parameter; and
    comparing the sensing data with the maximum threshold and the minimum threshold, and if the sensing data has a value other than the maximum threshold and the minimum threshold, compensating the sensing data so that the sensing data is near the maximum threshold or the minimum threshold, which is calculated based on the average value of the sensing data of the previous frame, or within the range between the maximum and minimum thresholds.

8. The method of claim 7, wherein the maximum threshold for the first mode is calculated by a first equation: average value of previous frame+average value of previous frame*gain, the minimum threshold for the first mode is calculated by a second equation: average value of previous frame−average value of previous frame*gain, the maximum threshold for the second mode is calculated by the second equation: average value of previous frame−average value of previous frame*gain, and the minimum threshold for the second mode is calculated by the second equation: average value of previous frame−average value of previous frame*gain.

9. The method of claim 8, wherein the procedure of comparing the sensing data with the maximum threshold and the minimum threshold and compensating the sensing data so that the sensing data is near the maximum threshold, near the minimum threshold or within the range between the maximum and minimum thresholds is performed M times (M is an integer equal to or greater than 1) or more.

* * * * *